United States Patent
Wang et al.

(10) Patent No.: US 12,249,324 B1
(45) Date of Patent: Mar. 11, 2025

(54) TARGETED CONTENT FEEDBACK IN SPOKEN LANGUAGE LEARNING AND ASSESSMENT

(71) Applicant: Educational Testing Service, Princeton, NJ (US)

(72) Inventors: Xinhao Wang, San Carlos, CA (US); Klaus Zechner, Princeton, NJ (US); Christopher Hamill, Princeton, NJ (US)

(73) Assignee: Educational Testing Service, Princeton, NJ (US)

(*) Notice: Subject to any disclaimer, the term of this patent is extended or adjusted under 35 U.S.C. 154(b) by 174 days.

(21) Appl. No.: 17/319,150

(22) Filed: May 13, 2021

Related U.S. Application Data (60) Provisional application No. 63/025,260, filed on May 15, 2020.

(51) Int. Cl.
*G10L 15/22* (2006.01)
*G06F 40/205* (2020.01)
(Continued)

(52) U.S. Cl.
CPC .......... *G10L 15/22* (2013.01); *G06F 40/205* (2020.01); *G06N 7/01* (2023.01); *G10L 25/27* (2013.01); *G10L 2015/225* (2013.01)

(58) Field of Classification Search
CPC . G06N 20/00; G06N 3/08; G06N 7/01; G06F 40/30; G06F 40/205; G06F 40/35; G06F 16/90332; G10L 15/22; G10L 15/1822; G10L 15/1815; G10L 2015/225; G10L 25/27
(Continued)

(56) References Cited

U.S. PATENT DOCUMENTS 9,355,372 B2 * 5/2016 Howald .................. G06F 40/35
9,652,999 B2 * 5/2017 Yoon ...................... G09B 19/06
(Continued)

OTHER PUBLICATIONS

Kendall, Alex et al. "Multi-task Learning Using Uncertainty to Weigh Losses for Scene Geometry and Semantics." 2018 IEEE/CVF Conference on Computer Vision and Pattern Recognition (2017): 7482-7491 (Year: 2017).*
(Continued)

*Primary Examiner* — Richemond Dorvil
*Assistant Examiner* — Rodrigo A Chavez
(74) *Attorney, Agent, or Firm* — Jones Day (57) ABSTRACT

Data is received by an automated spoken language learning and assessment system that includes a passage of text comprising a response to stimulus material. Thereafter, at least one machine learning model is used to detect absent key points within the passage of text and/or location spans of key points in the passage of text. The at least one machine learning model can be trained using a corpus with annotated key points and a span for each key point. In addition, each of the detected key points is scored by at least one key point quality model to result in a corresponding key point score. Diagnostic feedback targeting content development skills is then determined based on the detecting and using the key point scores. Data can then be provided which characterizes such diagnostic feedback. Related apparatus, systems, techniques and articles are also described.

20 Claims, 3 Drawing Sheets

(51) Int. Cl.
  *G06N 7/01* (2023.01)
  *G10L 25/27* (2013.01)
(58) Field of Classification Search
  USPC ........................................................ 704/200
  See application file for complete search history.

(56) References Cited

U.S. PATENT DOCUMENTS

| | | | | |
|---|---|---|---|---|
| 10,380,490 | B1* | 8/2019 | Somasundaran | G06F 40/253 |
| 10,388,274 | B1* | 8/2019 | Hoffmeister | G06N 3/044 |
| 10,818,193 | B1* | 10/2020 | Sullivan | G09B 19/04 |
| 11,694,801 | B2* | 7/2023 | Kartoun | G06N 20/00 |
| | | | | 705/2 |
| 12,080,187 | B1* | 9/2024 | Ferrucci | G06F 40/30 |
| 2009/0197225 | A1* | 8/2009 | Sheehan | G09B 17/003 |
| | | | | 434/169 |
| 2014/0370485 | A1* | 12/2014 | Deane | G09B 7/02 |
| | | | | 434/353 |
| 2017/0116881 | A1* | 4/2017 | Cohen | G09B 5/06 |
| 2018/0025303 | A1* | 1/2018 | Janz | G16H 50/20 |
| | | | | 705/2 |
| 2020/0051451 | A1* | 2/2020 | Goyal | G09B 7/04 |
| 2020/0202737 | A1* | 6/2020 | Aiyer | G06T 19/20 |
| 2020/0218746 | A1* | 7/2020 | Fan | G06N 3/044 |
| 2020/0334416 | A1* | 10/2020 | Vianu | G06V 10/764 |
| 2021/0192140 | A1* | 6/2021 | Galley | H04L 51/42 |
| 2021/0256436 | A1* | 8/2021 | Nag | G06F 40/30 |
| 2021/0264106 | A1* | 8/2021 | Li | G06F 18/2148 |
| 2021/0326747 | A1* | 10/2021 | Shi | G06N 5/04 |
| 2021/0328888 | A1* | 10/2021 | Rath | H04L 41/5074 |
| 2022/0083739 | A1* | 3/2022 | Magnusson | G06N 3/088 |

OTHER PUBLICATIONS

Zechner, Klaus, Evanini, Keelan; Automated Speaking Assessment: Using Language Technologies to Score Spontaneous Speech; New York, NY: Routledge; 2019.
Franco, Horacio, Bratt, Harry, Rossier, Romain, Gade, Venkata Rao, Shriberg, Elizabeth, Abrash, Victor, Precoda, Kristin; EduSpeak: A Speech Recognition and Pronunciation Scoring Toolkit for Computer-Aided Language Learning Applications; Language Testing, 27(3); pp. 401-418; 2010.
Zechner, Klaus, HIGGINGS, Derrick, XI, Xiaoming, Williamson, David; Automatic Scoring of Non-Native Spontaneous Speech in Tests of Spoken English; Speech Communication, 51(10); pp. 883-895; Oct. 2009.
Bernstein, Jared, Cheng, Jian, Suzuki, Masanori; Fluency and Structural Complexity as Predictors of L2 Oral Proficiency; Proceedings of InterSpeech; pp. 1241-1244; 2010.
Chen, Lei, Zechner, Klaus, Yoon, Su-Youn, Evanini, Keelan, Wang, Xinhao, Loukina, Anastassia, Tao, Jidong, Davis, Lawrence, Lee, Chong Min, Ma, Min, Munkowsky, Robert, Lu, Chi, Leong, Chee Wee, Gyawali, Binod; Automated Scoring of Nonnative Speech Using the SpeechRater v. 5.0 Engine; Educational Testing Service, Research Report RR-18-10; Apr. 2018.
Qian, Yao, Ubale, Rutuja, Mulholland, Matthew, Evanini, Keelan, Wang, Xinhao; A Prompt-Aware Neural Network Approach to Content-Based Scoring of Non-Native Spontaneous Speech; Proceedings of the 2018 Workshop on Spoken Language Technology; pp. 979-986; Dec. 2018.
Xie, Shasha, Evanini, Keelan, Zechner, Klaus; Exploring Content Features for Automated Speech Scoring; Conference of the North American Chapter of the Association for Computational Linguistics: Human Technologies; pp. 103-111; 2012.
Yoon, Su-Youn, LEE, Chong Min; Content Modeling for Automated Oral Proficiency Scoring System; Proceedings of the 14th Workshop on Innovative Use of NLP for Building Educational Applications; Florence, Italy; pp. 394-401; Aug. 2019.
Loukina Anastassia, Cahill, Aoife; Automated Scoring Across Different Modalities; Proceedings of the 11th Workshop on Innovative Use of NLP for Building Educational Applications; San Diego, CA; pp. 130-135; Jun. 2016.
Wang, Xinhao, Gyawali, Binod, Bruno, James, Molloy, Hillary, Evanini, Keelan, Zechner, Klaus; Using Rhetorical Structure Theory to Assess Discourse Coherence for Non-Native Spontaneous Speech; Proceedings of Discourse Relation parsing and Treebanking (DISRPT2019); Minneapolis, MN; pp. 153-162; Jun. 2019.
Wang, Xinhao, Evanini, Keelan, Zechner, Klaus, Mulholland, Matthew; Modeling Discourse Coherence for the Automated Scoring of Spontaneous Spoken Responses; Proceedings of the 7th ISCA Workshop on Speech and Language Technology in Education (SLaTE); Stockholm, Sweden; pp. 132-137; Aug. 2017.
Yoon, Su-Youn, Hsieh, Ching-Ni, Zechner, Klaus, Mulholland, Matthew, Wang, Yuan, Madnani, Nitin; Toward Automated Content Feedback Generation for Non-Native Spontaneous Speech; Proceedings of the 14th Workshop on Innovative Use of NLP for Building Educational Applications; Florence, Italy; pp. 306-315; Aug. 2019.
Vaswani, Ashish, SHazeer, Noam, Parmar, Niki, Uszkoreit, Jakob, jones, Llion, Gomez, Aidan, Kaiser, Lukasz, POLOSUKHIN, Illia; Attention Is All You Need; 31st Conference on Neural Information Processing Systems; Long Beach, CA; pp. 5998-6008; 2017.
Kendal, Alex, Gal, Yarin, Cipolla, Roberto; Multi-Task Learning Using Uncertainity to Weigh Losses for Scene Geometry and Semantics; IEEE Conference on Computer Vision and Pattern Recognition; Salt Lake City, UT; pp. 7482-7491; Jun. 2018.
Devlin, Jacob; Chang, Ming-Wei, Lee, Kenton, Toutanova, Kristina; Bert: Pre-Training of Deep Bidirectional Transformers for Language Understanding; Proceedings of the Conference of the North American Chapter of the Association for Computational Linguistics: Human Language Technologies, vol. 1; Minneapolis, MN; pp. 4171-4186; Jun. 2019.
Liu, Yinhan, Ott, Myle, Goyal, Naman, DU, Jingfei, Joshi, Mandar, Chen, Danqi, Levy, Omer, Lewis, Mike, Zettlemoyer, Luke, Stoyanov, Veselin; RoBERTa: A Robustly Optimized BERT Pretraining Approach; arXiv:1907.11692; Jul. 2019.
Sato, Takanori; The Contribution of Test-Takers' Speech Content to Scores on an English Oral Proficiency Test; Language Testing, 29(2); pp. 223-241; 2011.
Brown, Annie, Iwashita, Noriko, McNamara, Tim; An Examination of Rater Orientations and Test-Taker Performance on English-for-Academic-Purposes Speaking Tasks; Educational Testing Service Research Report; Monograph Series, MS-29, Apr. 2005.
Frost, Kellie, Elder, Catherine, Wigglesworth, Gillian; Investigating the Validity of an Integrated Listening-Speaking Task: A Discourse-Based Analysis of Test Takers' Oral Performances; Language Testing, 29(3); pp. 345-369, 2011.
Hsieh, Ching-Ni, Wang, Yuan; Speaking Proficiency of Young Language Students: A Discourse-Analytic Study; Language Testing, 36(1); pp. 27-50; 2019.
Rajpurkar, Pranav, Jia, Robin, Liang, Percy; Know What You Don't Know: Unanswerable Questions for SQuAD; Proceedings of the 56th Annual Meeting of the Association for Computational Linguistics (Short Papers); Melbourne, Australia; pp. 784-789; Jul. 2018.
Rajpurkar, Pranav, Zhang, Jian, Lopyrev, Konstantin, Liang, Percy; SQuAD: 100,000+ Questions for Machine Comprehension of Text; Proceedings of the Conference on Empirical Methods in Natural Language Processing; Austin, Texas; pp. 2383-2392; Nov. 2016.
Peters, Matthew, Neumann, Mark, Iyyer, Mohit, Gardner, Matt, Clark, Christopher, Lee, Kenton, Zettlemoyer, Luke; Deep Contextualized Word Representations; Proceedings of the 2018 Conference of the North American Chapter of the Association for Computational Linguistics: Human Language Technologies, vol. 1 (Long Papers); New Orleans, LA; pp. 2227-2237; Jun. 2018.
Radford, Alec, Narasimhan, Karthik, Salimans, Tim, Sutskever, Ilya; Improving Language Understanding with Unsupervised Learning; OpenAI, Technical Report; 2018.
Yang, Zhilin, DAI, Zihang, Yang, Yiming, Carbonell, Jaime, Salakhutdinov, Ruslan, LE, Quoc; XLNet: Generalized Autoregres- (56) References Cited

OTHER PUBLICATIONS sive Pretraining for Language Understanding; Advances in Neural Information Processing Systems; pp. 5754-5764; 2019.

Wolf, Thomas, Debut, Lysandre, Sanh, Victor, Chaumond, Julien, Delangue, Clement, Moi, Anthony, Cistac, Pierric, Rault, Tim, Louf, Remi, Funtowicz, Morgan, Davison, Joe, Shleifer, Sam, Von Platen, Patrick, Ma, Clara, Jernite, Yacine, Plu, Julien, Xu, Canwen, Le Scao, Teven, Gugger, Sylvain, Drame, Mariama, Lhoest, Wuentin, Rush, Alexander; Huggingface's Transformers: State-of the Art Natural Language Processing; arXiv:1910.03771; 2019.

Zhu, Yukun, Kiros, Ryan, Zemel, Rich, Salakhutdinov, Ruslan, Urtasun, Raquel, Torralba, Antonio, Fidler, Sanja; Aligning Books and Movies: Towards Story-Like Visual Explanations by Watching Movies and Reading Books; Proceedings of the IEEE International Conference on Computer Vision; Santiago, Chile; pp. 19-27; Dec. 2015.

Liu, Xiaodong, HE, Pengcheng, Chen, Weizhu, Gao, Jianfeng; Multi-Task Deep Neural Networks for Natural Language Understanding; Proceedings of the 57th Annual Meeting of the Association for Computational Linguistics; Florence, Italy; pp. 4487-4496; Jul.-Aug. 2019.

Xi, Xiaoming; Automated Scoring and Feedback Systems: Where Are We and Where Are We Heading?; Language Testing, 27(3); pp. 291-300; 2010.

Pedregosa, Fabian, Varoquaux, Gael, Gramfort, Alexandre, Michel, Vincent, Thirion, Bertrand, Grisel, Olivier, Blondel, Mathieu, Prettenhofer, Peter, Weiss, Ron, Dubourg, Vincent, Vanderplas, Jake, Passos, Alexandre, Cournapeau, David, Brucher, Matthieu, Perrot, Matthieu, Duchesnay, Edouard; Scikit-learn: Machine Learning in Python; Journal of Machine Learning Research, 12; pp. 2825-2830; 2011.

\* cited by examiner

TARGETED CONTENT FEEDBACK IN SPOKEN LANGUAGE LEARNING AND ASSESSMENT

RELATED APPLICATION

The current application claims priority to U.S. Pat. App. Ser. No. 63/025,260 filed on May 15, 2020, the contents of which are hereby fully incorporated by reference.

TECHNICAL FIELD

The subject matter described herein relates to accurate and actionable diagnostic feedback within the context of computer-based spoken language learning and assessment, in particular, targeting the content development skill.

BACKGROUND

When evaluating a language learner's spontaneous speech production, a wide range of speech dimensions must be evaluated, including aspects of fluency, pronunciation, rhythm, vocabulary range, grammatical accuracy, content appropriateness, and discourse organization. Systems for automated scoring of speech have focused predominantly on aspects of fluency, pronunciation and prosody, and to a lesser extent on aspects of vocabulary and grammar, content appropriateness, and discourse coherence. Assessing to what extent a test taker produces particular aspects of content in a spoken response not only enables more precise measures of spoken proficiency in this content domain but furthermore also enable language learners to obtain diagnostic/targeted feedback automatically from such automated systems.

SUMMARY

In a first aspect related to an automated spoken language learning and assessment system, data is received that includes a passage of text comprising a response to stimulus material. Thereafter, at least one machine learning model is used to detect absent key points within the passage of text and/or location spans of key points in the passage of text. The at least one machine learning model can be trained using a corpus with annotated key points and a span for each key point. Subsequently, each of the detected key points is scored by at least one key point quality model to result in a corresponding key point score. Diagnostic feedback targeting content development skills is then determined based on the detecting and using the key point scores. Data can then be provided which characterizes such diagnostic feedback.

The key point quality model can be a regression model which weighs key points and associated spans of key points when generating the key point scores.

In some variations, a proficiency of the response in providing content coverage can be scored using at least one scoring model and based on the detecting. Data of such scoring can be provided. The scoring model can be a regression model which weighs the key point quality scores for each key point when generating the proficiency score.

A digital recording of the response to stimulus material can be received. This recording can be parsed, using automated speech recognition, into the passage of text.

A multi-task learning approach can be used to characterize how well key points are rendered in the response using a multi-task learning approach. The multi-task learning approach can automatically weigh multiple loss functions by considering a homoscedastic uncertainty of each task.

The at least one machine learning model can take various forms including a transformer model. The transformer model can include Bidirectional Encoder Representations from Transformer (BERT) model and/or a Robustly optimized Bidirectional Encoder Representations from Transformer (ROBERTa) model. The transformer model can be trained using key points concatenated with a corresponding responses to the stimulus material.

The corpus used to train the at least one machine learning model can include ratings (or other values) for each response to each of a plurality of key points indicating a level of coverage.

The providing data can include one or more of: causing the data characterizing the determined diagnostic feedback to be displayed in an electronic visual display, storing the data characterizing the determined diagnostic feedback in physical persistence, loading the data characterizing the determined diagnostic feedback into memory, or transmitting the data characterizing the determined diagnostic feedback over a network to a remote computing device.

Non-transitory computer program products (i.e., physically embodied computer program products) are also described that store instructions, which when executed by one or more data processors of one or more computing systems, cause at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including but not limited to a connection over a network (e.g., the Internet, a wireless wide area network, a local area network, a wide area network, a wired network, or the like), via a direct connection between one or more of the multiple computing systems, etc.

The subject matter described herein provides many technical advantages. For example, the current subject matter formalizes a key point detection task towards the application of an automatic spoken language learning and assessment system. The current subject matter also provides techniques for building automatic detection models based on Transformers, which can significantly outperform human performance on the task of key point identification. Further, the current subject matter improves the language representation with more in-domain unlabeled data, which can further improve the target downstream key point detection performance.

The details of one or more variations of the subject matter described herein are set forth in the accompanying drawings and the description below. Other features and advantages of the subject matter described herein will be apparent from the description and drawings, and from the claims.

DETAILED DESCRIPTION

The current subject matter is directed to computer-based systems and methods for providing targeted content feedback as part of language learning and assessment as part of an automated spoken language learning and assessment system. In some implementations, such systems and method can indicate, for instance, which critical content (hereafter referred to as key points) is present or absent from the learner's response and provide interactive guidance to language learners to improve the content aspect of their responses to a particular question. In addition, with the current subject matter, key point-based features are utilized in an automated spoken language learning and assessment system to measure the content coverage and correctness of spoken responses. In particular, provided herein is an automatic, computer-based generation of targeted content feedback on spontaneous speech can be characterized as 1) detecting the presence/absence of each predefined key point and locating the span of each one that appears in a test response; and 2) predicting quality score for each detected key point, which can indicate how well a key point is rendered in a test response.

As an example, the current subject matter focuses on one type of test question widely used in speaking assessment where test takers are required to first listen to and/or read stimulus material and then create a spontaneous response to a question related to the stimulus. In a high-proficiency response, critical content from the source material-referred to as "key points"-should be properly covered. Machine learning models (e.g., transformer-based models, etc.) are provided to automatically detect absent key points or location spans of key points present in an oral recording of a response. Furthermore, provided herein is a multi-task learning approach to measure how well a key point is rendered within a response (quality score). Experimental results show that automatic models can surpass human expert performance on both tasks: for span detection, the system performance reached an F1 score of 74.5% (vs. human agreement of 68.3%); for quality score prediction, system performance reached a Pearson correlation coefficient (r) of 0.744 (vs. human agreement of 0.712). In addition, it is shown that the current key point-based features can be used to predict speaking proficiency scores with a correlation of 0.730.

The use of a transformer architecture as provided herein makes it possible to generate reliable targeted content feedback that can be used by test takers to improve their content development performance. In validating the current subject matter, a setup similar to a question answering task with the purpose of key point span detection was used, and a multi-task learning strategy was used to jointly optimize both key point span detection and quality score prediction. Example Transformer-based models can be used namely, BERT and ROBERTa. The motivation for using these Transformers is not only their high performance on many diverse natural language processing tasks, but also and in particular their ability to use only comparatively small annotated data sets for supervised fine-tuning after unsupervised pre-training on a large unlabeled data set. Furthermore, as the utilized corpus contains spontaneous nonnative speech, a particular key point can be rendered in many different ways by a test taker (or language learner), and hence the current subject matter can leverage the ability of a Transformer network to generalize from particular example instances to semantically similar renderings in unseen evaluation data.

Integrated Tasks and Key Points. In many large-scale English spoken language assessments, one type of widely used task is called an integrated test item. Such items ask test takers to first listen to and/or read stimulus materials, then construct a spoken response to a related test question. As the name suggests, these items require test takers to integrate multiple language skills (listening/reading and speaking) in a substantial way to complete the task. In the field of language testing, research has repeatedly shown that human raters pay considerable attention to speech content while scoring. As such, the current subject matter focuses on providing a reliable way to generate targeted content feedback with the goal of automatic spoken language learning and assessment.

The following is an example test question (stimulus material) from which a response is obtained. In some variations, the response is an audio recording which is parsed into text/tokens using automated speech recognition (ASR) technologies. In other cases, the responses are provided in a written form. In some implementations, the stimulus material can be audiovisual in nature such as a recorded conversation.

Test Question:
Listen to a conversation between two English professors
Briefly summarize the problem the professors are discussing. Then state which of the two solutions from the conversation you would recommend. Explain the reasons for your recommendation.

6 Key-Points:
KP-1: Problem: The woman is supposed to lead a review session (for her poetry class) tomorrow.
KP-2: Problem: But there is a (retirement) party (for her cousin) at the same time (4:00).
KP-3: Solution 1: The man does the review session for her.
KP-4: Solution 2: She does the review session herself and arrives late to the party.
KP-5: The test taker agrees with either Solution 1 or Solution 2.
KP-6: Based on above choice, explain drawback of solution 1 (He hasn't taught poetry in a few years and is rusty) and/or drawback of solution 2 (She will miss a lot of the party, including speeches).

Example Response
The woman's problem is that she has a scheduling conflict, KP-1: she has a poetry class a—at four o'clock and it's a very important class because next week is an exam. KP-2: And another schedule is that she she has to she has to participate in her cousin's retirement party. And then there is two solutions and KP-3: the first is to let the man cover her class for her, for her and KP-4: the second is just go just give a lecture to the students. KP-5: If I were the woman I would choose the first solution, KP-6: I think there will be no problem because she will give the material to the man and students will um understand her situation enough. And also when she doesn't go, her cousin will be extremely disappointed because she already missed several events. By choosing the first solution, she doesn't have to worry about her students and her cousin will be very glad if she comes.

When test takers integrate stimulus materials to create a spoken response on an integrated item, a critical measure of content coverage and correctness is the degree to which the source materials can be accurately reflected/reproduced. Accordingly, key points can be defined as the critical content from the source materials that should be properly rendered in a high-proficiency response to a related test question. Research in language testing has shown a clear positive relationship between the number of key points covered and proficiency levels.

Data Annotation. The data used in this study consisted of one-minute responses to four integrated test items from a large-scale standardized international language assessment. According to each test item, a list of six key points related to the listening and/or reading stimulus materials was identified in advance by test developers and English language learning experts. During the operational test, responses were scored by expert human raters on a four-point scale ranging from 1 (lowest proficiency) to 4 (highest proficiency). In total, 960 responses were collected and balanced according to test questions and proficiency scores; thus, there are 60 responses per item at each score level.

Two experts in the domains of language teaching and assessment then annotated the human transcriptions of these responses. The annotations fell into two categories: ratings and text spans. First, for each of the six key points, the annotators rated every response on a three-point scale, where 1 indicated full coverage of the relevant key point, 0.5 indicated partial coverage, and 0 indicated no coverage; these ratings served as the quality score for each key point. Second, the annotators identified the spans of text from a response which covered each key point. For missing key points, no spans were annotated.

Among the 960 responses, 400 were selected for double-annotation, i.e., 100 from to each test item, and the remaining 560 responses were split approximately evenly between the two annotators and received single-annotation from either annotator. In the following sections, the 560 single-annotated responses were taken as the training set, and the 400 double-annotated responses were taken as the test set. Regarding the development of key point detection models, since each response was annotated with six key points, in total, there are 3,360 and 2,400 samples in the training and test sets, respectively.

Task Setup. Given a test response and a related key point, the task of automatic key point detection is to detect the span of the key point if it is covered in the response; otherwise, the key point's absence is detected. This can be analogous to a typical question answering task that has been widely studied in the field of natural language processing, i.e., SQUAD V2.0. SQUAD (Stanford Question Answering Dataset) is a reading comprehension data set, where questions were asked on a set of Wikipedia articles, and the answer to every question is a segment of text (span) from the corresponding reading passage. Especially in SQUAD V2.0, some questions might be unanswerable.

In connection with experimental efforts to support the current subject matter, a setup similar to SQUAD V2.0 was used in which the macro-averaged F1 score was used as the evaluation metric. F1 measures the average overlap between the predictions and ground truth, ignoring punctuation as well as articles, and with the prediction/ground truth taken as bags of tokens. Compared with the answers in SQUAD, key point spans in our task tend to be longer narrative sentences, and the average number of words within spans is around 18.3 (sd=13.8). Furthermore, as described above, each identified key point was assigned a quality score in a range from 0 to 1 by human experts. Therefore, a regression/machine learning model can be built/trained to measure how well a key point is rendered within a response, and the Pearson correlation coefficient of automated scores with manual scores can be used as the evaluation metric.

Transformer-based Models. For the current key point detection task, various types of machine learning models can be utilized including the Transformer architecture. Example Transformer-based models include, for example, BERT (Bi-directional Encoder Representations from Transformer) and ROBERTa (Robustly Optimized BERT Approach), were explored to build the automatic detection models.

BERT can pre-train deep bidirectional representations from unlabeled texts by introducing a pre-training objective known as "masked language model" (MLM), which can alleviate the unidirectionality constraint and jointly condition on both left and right contexts in all layers.

With a pre-trained model, the self-attention mechanism in the transformer architecture makes it straightforward to further fine-tune on downstream tasks, such as key point detection. As shown in diagram 100 of FIG. 1, at the input, concatenated pairs of key points and test responses are plugged in. At the output, one additional layer is added to predict the span of a key point. Especially for a missing key point, a span which both starts and ends at the first special token [CLS] will be returned. In addition, since each labeled key point is associated with a quality score, the additional layer can be modeled to predict the quality scores using the aggregate representation from the final hidden vector C corresponding to the special token [CLS]. The detection model is first initialized with pre-trained parameters, and then all parameters are fine-tuned with task-specific labeled data.

ROBERTa is an alternative version of BERT with an improved training recipe, including the application of a dynamic masking strategy on the input training data; dropping the NSP objective and training on longer sequences; increasing the size of mini-batches and training models longer; as well as some other changes to design choices and training strategies. The MLM objective is used to pre-train both BERT and ROBERTa models.

Experimental Setup. An implementation from Hugging Face was used to build the detection models, and the BERT and ROBERTa models were experimented with both base and large sizes, which were pre-trained on a large amount of written texts from BooksCorpus, English Wikipedia, and other text corpora. With L as the number of layers (i.e., Transformer blocks); A as the number of self-attention heads; and H as the hidden size, the four experimented models are BERT Base (L=12; A=12; H=768; 110M parameters), BERT Large (L=24; A=16; H=1024; 340M parameters), ROBERTa Base (L=12; A=12; H=768; 125M parameters), and ROBERTa Large (L=24; A=16; H=1024; 355M parameters). All four models were fine-tuned with six epochs on the downstream task, and the number of warmup steps is set to be around 10% of the total steps. In order to make parallel comparisons with human experts' agreement, manual transcriptions were used as the input for model training and evaluation.

TABLE 1

Key point detection performance in terms of F1 score on fine-tuned base/large BERT/RoBERTa models. The human agreement is also listed for comparison.

| Models | Base | Large |
|---|---|---|
| BERT | 69.7 | 71.7 |
| RoBERTa | 70.0 | 71.9 |
| Human_Agreement | | 68.3 |

Span Detection. A first task is to detect the spans of key points without predicting quality scores. Table 1 shows that in terms of F1 score, all four models outperform human agreement (F1=68.3%), and that the large models generally perform better than the base models. Therefore, in the following experiments only results with the large models are reported. In addition, ROBERTa shows slightly higher performance than BERT on this task, i.e., 71.9% vs. 71.7%.

Improvement in Language Representation. Human transcriptions of non-native spontaneous speech are quite different from the written texts used to pre-train BERT and ROBERTa models. This mismatch may result in less satisfying language representation while applying these pre-trained models on speech data, especially for low-proficiency responses. Therefore, in order to obtain models with better language representation capabilities on speech, a data set was collected with human transcriptions on 58,291 spoken responses drawn from the same assessment, and the data set was used to first fine-tune BERT/ROBERTa with MLM, where the number of training epochs was set at four, and around 10% of the total steps were used for warmup. Afterwards, the obtained in-domain models were further fine-tuned on the downstream span detection task with labeled data. The experimental results indicate that adding more in-domain unlabeled data can greatly benefit the downstream task; the F1 scores can be improved from 71.7% to 74.5% for BERT, and from 71.9% to 73.3% for ROBERTa respectively. Therefore, the models fine-tuned with in-domain data were adopted in the following experiments.

Multi-task Learning. Multi-task learning as provided herein, can benefit deep learning applications by jointly optimizing regression and/or classification objectives across multiple tasks. Referring again to FIG. 1, a Transformer-based model can be built to complete both the automatic detection of key point spans and the automatic prediction of key point quality scores at the same time, where the span detection task uses cross-entropy loss, and the scoring task uses mean square error loss. As each task's loss may range on a different scale, it is important to weight relatively between losses of multiple tasks. However, tuning these weights by hand is expensive; thus, multiple loss functions were automatically weighted by considering the homoscedastic uncertainty of each task.

Figure 1:
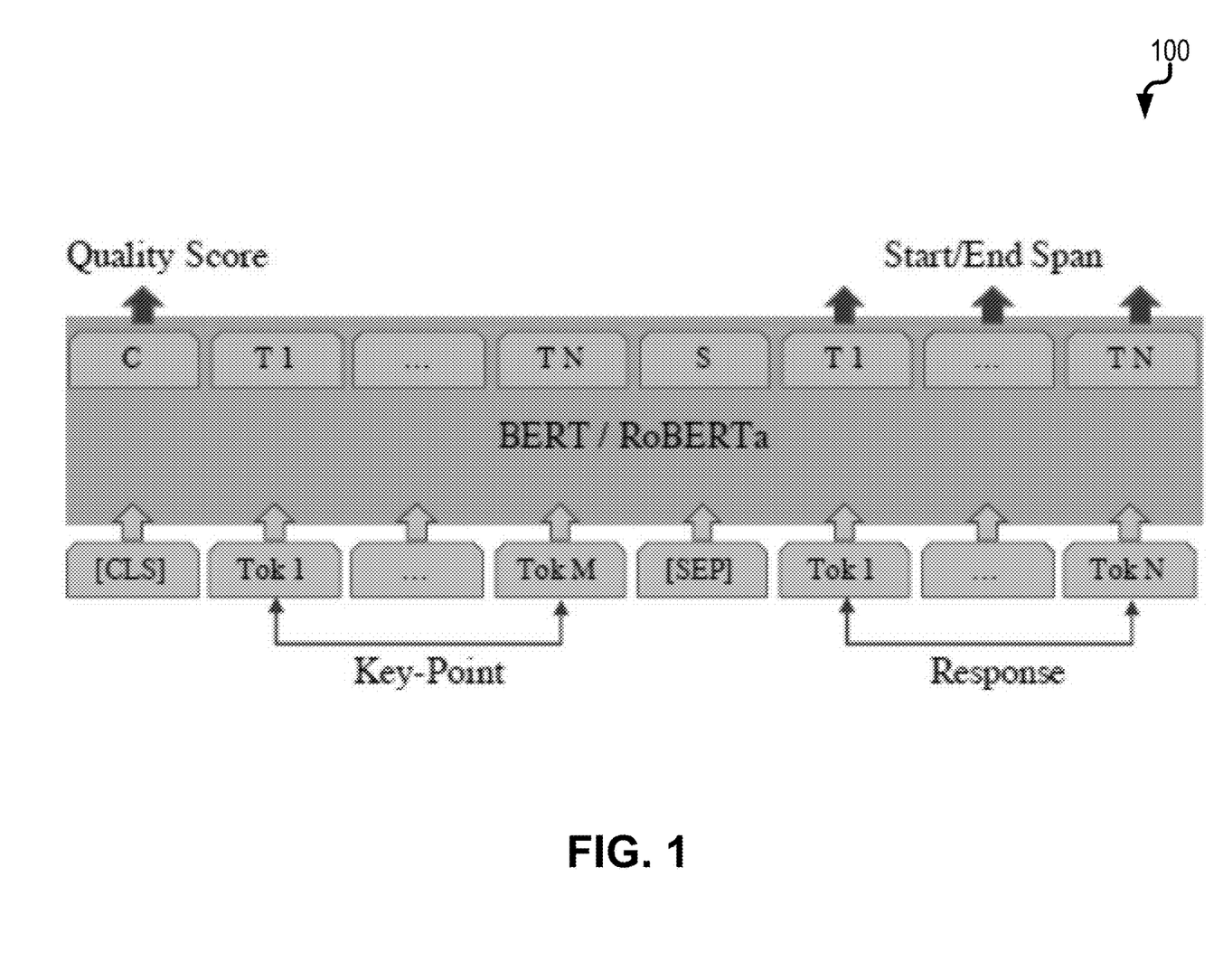
FIG. 1 is a system diagram illustrating a Transformer-based model for characterizing key points.

The multi-task learning can jointly optimize MSE loss (quality score regression) and Cross-Entropy loss (key point span detection), and learn the relative weights of each loss in a principled and well-founded way.

$$\mathcal{L}(W, \sigma_1, \sigma_2) = \frac{1}{2\sigma_1^2}\mathcal{L}_1(W) + \frac{1}{\sigma_2^2}\mathcal{L}_2(W) + \log\sigma_1\sigma_2$$

$\sigma_1$: task-dependent noise for the task of quality score regression $\sigma_2$: task-dependent noise for the task of key point span detection Minimizing this objective with respect to noise $\sigma_1$ and $\sigma_2$ can be interpreted as learning the relative weights of the losses adaptively. The last term acts as regularization for the noise terms Table 2 shows that by conducting multi-task learning, the performance on span detection can be improved with RoBERTa from 73.3% to 74.1%, but no further improvement can be obtained with BERT. Moreover, the Pearson correlations coefficients between automatic scores and manual key point quality scores are 0.739 for BERT and 0.744 for ROBERTa respectively, which are higher than the correlation with human agreement of 0.712.

TABLE 2

Performance improvement by introducing multi-task learning, where both the span detection and quality score prediction tasks are jointly optimized. F1 scores for span detection and Pearson correlation coefficients (r) between automatic and manual scores are provided.

| Models | F1 (%) | r |
| --- | --- | --- |
| BERT_Large_inDomain | 74.5 | None |
| BERT_Large_inDomain_Multi | 74.5 | 0.739 |
| RoBERTa_Large_inDomain | 73.3 | None |
| RoBERTa_Large_inDomain_Multi | 74.1 | 0.744 |
| Human_Agreement | 68.3 | 0.712 |

Targeted Content Feedback. The automatic tool described herein provides actionable diagnostic feedback used by language learners and meets several conditions such as they can accurately identify errors of learner performance, they should be meaningful, easily interpretable, and actionable to users, and they can lead to gains in targeted areas of language ability. With the current subject matter, a tool was developed with the capability to provide targeted content feedback. The Transformer-based models can detect the missing pieces of key points within test takers' responses. They can also identify the locations of presented key points and determine whether they are properly rendered in the spoken response. Experimental results have demonstrated that automatic models can outperform human experts' agreement on this task. Hence the tool proposed in this paper meets the requirements of "accurate" and "actionable". In the future, a user study will be conducted to verify how much gain can be obtained in improving language learners' speaking skills, in particular, related to the content/topic elaboration/development.

Automated Speech Scoring. A set of key point-based features can be integrated into an automated speech assessment system to measure the content coverage and correctness of non-native spoken responses. In one example, there can be six key points defined for each integrated test question; accordingly, six features can be defined as the six quality scores, one for each key point (with 0 for absent key points); furthermore, the quality scores can be summed together as an additional feature to measure the overall quality. As shown in Table 2, the ROBERTa Large inDomain Multi model can achieve a relatively higher correlation with quality scores; thus, automatic features were extracted with predictions generated by this model and evaluated in terms of Pearson correlation coefficients with human proficiency scores. Experimental results show that the features corresponding to six key points can achieve correlations with human proficiency scores in a range from 0.356 to 0.628. In particular, the feature for the last key point can obtain a correlation of 0.628, since it generally contained more elaborated content depending on the nature of the test item. Finally, the summed feature (i.e., the sum of individual quality scores across all six key points) can achieve a correlation as high as 0.670.

The proposed key point features were examined within an automated spoken English assessment system, SpeechRaterR. The task was to build effective scoring models, which can automatically predict holistic proficiency scores by measuring different aspects of non-native speaking proficiency. The baseline scoring model was built with 28 automatic features extracted from the SpeechRater system, which can measure the pronunciation, prosody, fluency, rhythm, vocabulary, grammar, and cohesion of spontaneous speech. A Random Forest Regression method was used to build the scoring models, and 10-fold cross-validation was conducted on the test partition with 400 responses. The baseline system using only SpeechRater features can achieve a correlation of 0.832 with human proficiency scores. In comparison, the automatic model using only key point features can achieve a correlation of 0.730. Furthermore, by combining both SpeechRater and key point features, the correlation can be improved to 0.843. All experimental results have demonstrated the effectiveness of the current key point-based features in an automated speech scoring system.

Figure 2:
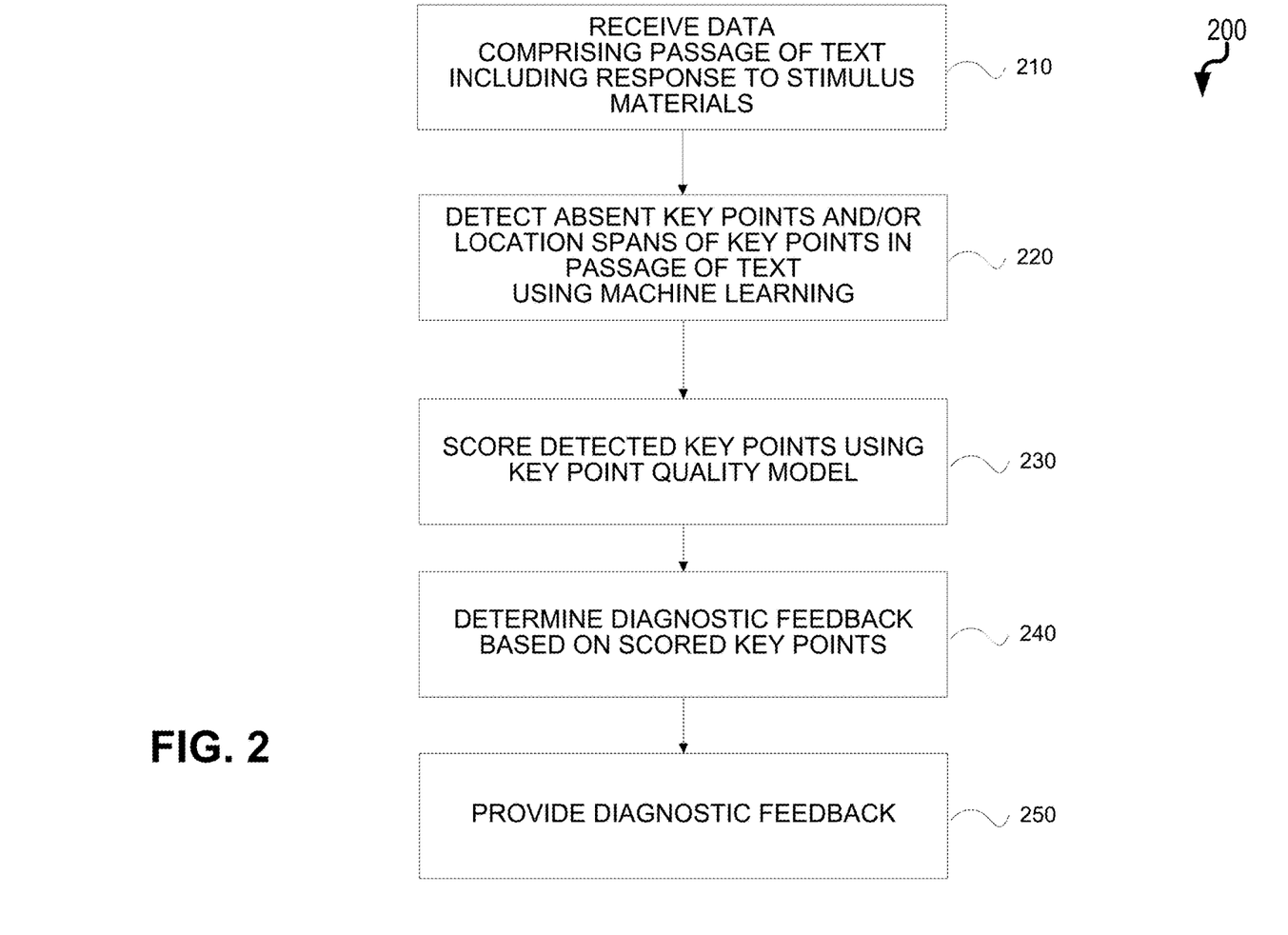
FIG. 2 is a process flow diagram illustrating targeted content feedback as part of an automated spoken language learning and assessment system.

FIG. 2 is a diagram in which, at 210, data is received that includes a passage of text comprising a response to stimulus material. Thereafter, at 220, at least one machine learning model is used to detect absent key points within the passage of text and/or location spans of key points in the passage of text. The at least one machine learning model can be trained using a corpus with annotated key points and a span for each key point. In addition, at 230, each of the detected key points is scored by at least one key point quality model to result in a corresponding key point score. Diagnostic feedback targeting content development skills is then determined, at 240, based on the detecting and using the key point scores. Data can then be provided, at 250, which characterizes such diagnostic feedback.

Figure 3:
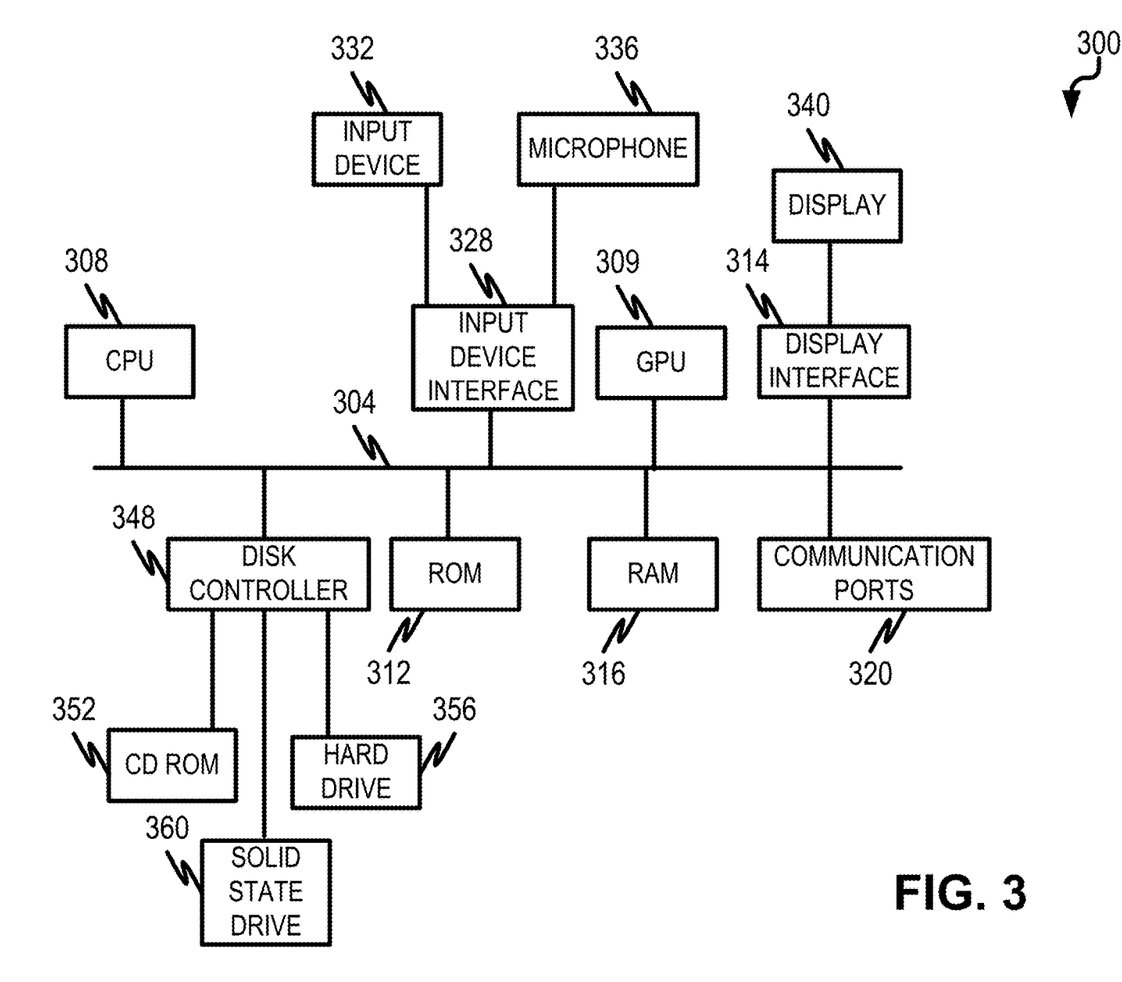
FIG. 3 is a diagram illustrating aspects of a computing device for implementing the current subject matter.

FIG. 3 is a diagram 300 illustrating a sample computing device architecture for implementing various aspects described herein. A bus 304 can serve as the information highway interconnecting the other illustrated components of the hardware. A processing system 308 labeled CPU (central processing unit) (e.g., one or more computer processors/data processors at a given computer or at multiple computers), can perform calculations and logic operations required to execute a program. A non-transitory processor-readable storage medium, such as read only memory (ROM) 312 and random access memory (RAM) 316, can be in communication with the processing system 308 and can include one or more programming instructions for the operations specified here. Optionally, program instructions can be stored on a non-transitory computer-readable storage medium such as a magnetic disk, optical disk, recordable memory device, flash memory, or other physical storage medium.

In one example, a disk controller 348 can interface with one or more optional disk drives to the system bus 304. These disk drives can be external or internal floppy disk drives such as 360, external or internal CD-ROM, CD-R, CD-RW or DVD, or solid state drives such as 352, or external or internal hard drives 356. As indicated previously, these various disk drives 352, 356, 360 and disk controllers are optional devices. The system bus 304 can also include at least one communication port 320 to allow for communication with external devices either physically connected to the computing system or available externally through a wired or wireless network. In some cases, the at least one communication port 320 includes or otherwise comprises a network interface.

To provide for interaction with a user, the subject matter described herein can be implemented on a computing device having a display device 340 (e.g., a CRT (cathode ray tube) or LCD (liquid crystal display) monitor) for displaying information obtained from the bus 304 via a display interface 314 to the user and an input device 332 such as a keyboard and/or a pointing device (e.g., a mouse or a trackball) and/or a touchscreen by which the user can provide input to the computer. Other kinds of input devices 332 can be used to provide for interaction with a user as well; for example, feedback provided to the user can be any form of sensory feedback (e.g., visual feedback, auditory feedback by way of a microphone 336, or tactile feedback); and input from the user can be received in any form, including acoustic, speech, or tactile input. The input device 332 and the microphone 336 can be coupled to and convey information via the bus 304 by way of an input device interface 328. Other computing devices, such as dedicated servers, can omit one or more of the display 340 and display interface 314, the input device 332, the microphone 336, and input device interface 328.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it is used, such a phrase is intended to mean any of the listed elements or features individually or any of the recited elements or features in combination with any of the other recited elements or features. For example, the phrases "at least one of A and B;"

"one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." In addition, use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A computer-implemented method comprising:
   receiving data comprising a passage of text comprising a transcription of a spoken response by a language learner to a test question relating to a stimulus material, wherein the spoken response was produced after listening to the stimulus material or reading the stimulus material;
   detecting, by at least one trained machine learning model, presences and absences of key points within the passage and location spans of the key points detected as being present within the passage, wherein:
      each key point comprises a predefined piece of content from the stimulus material,
      the location spans of the key points detected as being present within the passage tend to comprise one or more sentences, wherein each detected location span comprises at least five consecutive words, and
      the at least one machine learning model is configurable to be trained using a corpus comprising of a plurality of passages annotated with at least a quality score or a location span for each of a plurality of key points, and
   jointly optimize both location span detection and quality score prediction through automatic adjustment of relative weights associated with the location span detection and the quality score prediction, wherein each key point quality score is based on the relative weights associated with the location span detection and the quality score prediction, the relative weights having been jointly optimized during training;
   scoring, by the at least one trained machine learning model, a quality of each of the key points detected as being present within the passage to result in a corresponding key point quality score;
   determining, based on the detecting and the scoring, diagnostic feedback targeting content development skills of the language learner; and
   providing data characterizing the determined diagnostic feedback.

2. The method of claim 1, further comprising receiving an audio or audiovisual recording of the spoken response of the language learner, and parsing the recording into the passage of text using automated speech recognition.

3. The method of claim 1, wherein the at least one machine learning model comprises a transformer model.

4. The method of claim 3, wherein the transformer model comprises a Bidirectional Encoder Representations from Transformer (BERT) model.

5. The method of claim 4, wherein the BERT introduces a masked language model (MLM) followed by pre-training deep bidirectional representations from unlabeled texts.

6. The method of claim 3, wherein the transformer model comprises a Robustly optimized Bidirectional Encoder Representations from Transformer (ROBERTa) model.

7. The method of claim 3, wherein the transformer network generalizes from at least one key point at least one semantically similar rendering in unseen evaluation data.

8. The method of claim 1, wherein the data characterizing the determined diagnostic feedback is displayed in an electronic visual display; stored within physical, persistent storage; loaded into memory; or transmitted over a network to a remote computing device.

9. The method of claim 1, wherein each key point comprises a predefined piece of content from the stimulus material that is further predetermined to make up part of a high-proficiency response to the test question.

10. The method of claim 1, wherein the at least one trained machine learning model scores a content coverage of each of the key points detected as being present within the passage to generate a quality score.

11. The method of claim 1, wherein the at least one trained machine learning model comprises a regression model.

12. The method of claim 1, wherein the at least one trained machine learning model comprises a multi-task learning strategy.

13. The method of claim 12, wherein the joint optimization is achieved, at least in part, through automatic adjustment of relative weights across multiple loss functions by considering a homoscedastic uncertainty of both location span detection and key point quality score prediction.

14. The method of claim 12, wherein the location span detection uses cross-entropy loss, and the quality score prediction uses mean square error loss.

15. The method of claim 1, wherein the quality scores are summed together to measure the overall quality.

16. The method of claim 1, wherein the spoken response of the language learner is at least thirty seconds in duration.

17. The method of claim 1, wherein the response by the language learner comprises spontaneous, nonnative speech, and wherein a particular key point of the stimulus material can be rendered in many different ways by the language learner.

18. The method of claim 1, wherein the corpus contains spontaneous, nonnative speech, and wherein a particular key point within the corpus can be rendered in many different ways within the corpus.

19. An automated spoken language learning and assessment system comprising:
   at least one data processor; and a memory for storing instructions which, when executed by the at least one data processor, result in operations comprising:

receiving data comprising a passage of text comprising a transcription of a spoken response by a language learner to a test question relating to a stimulus material, wherein the spoken response was produced after listening to the stimulus material or reading the stimulus material;

detecting, by at least one trained machine learning model, presences and absences of key points within the passage and location spans of the key points detected as being present within the passage, wherein:

each key point comprises a predefined piece of content from the stimulus material, the location spans of the key points detected as being present within the passage tend to comprise one or more sentences, wherein each detected location span comprises at least five consecutive words, and the at least one machine learning model is configurable to be trained using a corpus comprising of a plurality of passages annotated with at least a quality score or a location span for each of a plurality of key points, and jointly optimize both location span detection and quality score prediction through automatic adjustment of relative weights associated with the location span detection and the quality score prediction;

scoring, by the at least one trained machine learning model, a quality of each of the key points detected as being present within the passage to result in a corresponding key point quality score, wherein each key point quality score is based on the relative weights associated with the location span detection and the quality score prediction, the relative weights having been jointly optimized during training;

determining, based on the detecting and the scoring, diagnostic feedback targeting content development skills of the language learner; and providing data characterizing the determined diagnostic feedback.

20. The system of claim 19, wherein the operations further comprise receiving an audio or audiovisual recording of the spoken response of the language learner, and parsing the recording into the passage of text using automated speech recognition.

* * * * *